Nov. 5, 1935.  R. T. WILLIAMS  2,020,168

ELECTRICAL CONTROL FOR VALVES

Filed Dec. 28, 1933  2 Sheets—Sheet 1

Inventor
R.T. WILLIAMS
By E. E. Huffman
Att'y

Nov. 5, 1935.  R. T. WILLIAMS  2,020,168
ELECTRICAL CONTROL FOR VALVES
Filed Dec. 28, 1933   2 Sheets-Sheet 2

Inventor
R. T. WILLIAMS
By *E. E. Huffman*
Att'y

Patented Nov. 5, 1935

2,020,168

UNITED STATES PATENT OFFICE 2,020,168

ELECTRICAL CONTROL FOR VALVES

Robert T. Williams, Quincy, Ill., assignor to Minneapolis-Honeywell Regulator Company, Minneapolis, Minn., a corporation of Delaware Application December 28, 1933, Serial No. 704,251

9 Claims. (Cl. 172—239)

My invention relates to electrical control means for valves and more particularly to improvements in the type of electrical control for valve structures, in which the valve is biased to a given position and is moved to another position against the biasing means by the action of electro-responsive means, as for example, an electric motor.

One object of my invention is to provide improved means independent of the motor for holding the valve in open position after it has been moved to said position by the motor and the motor has been automatically deenergized.

Another object of my invention is to provide thermostatically-controlled heat responsive means for controlling both the electrical circuit for the motor, and the means for holding the valve in open position.

Still another object of my invention is to provide thermostatic control means for an electric motor-actuated valve in which the current flowing through the thermostatic circuit will be only a fraction of the current necessary to operate the motor, thus producing a thermostatically-controlled system that does not require a permanent magnet in the thermostat to eliminate "fluttering" of the thermostatically-controlled electrical contacts.

Still other objects of my invention are to produce a thermostatically-controlled valve mechanism of the type referred to that is more silent in operation, more economical to manufacture and capable of more accurately regulating the valve in accordance with the temperature desired.

Figure 1:
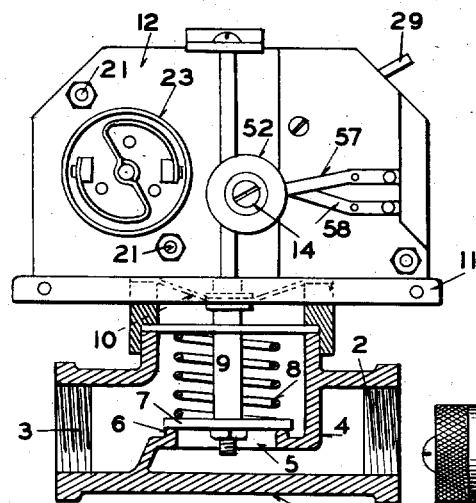
Figure 2:
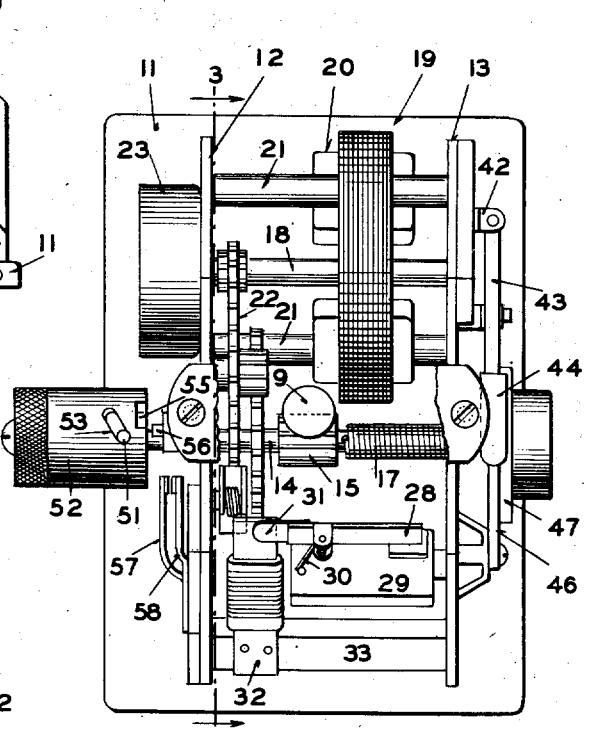
Figure 4:
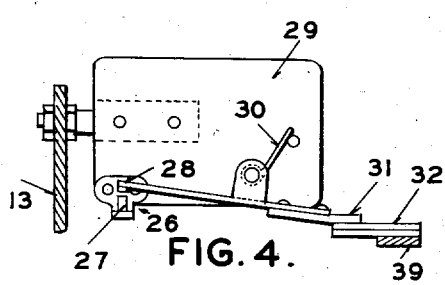
Figure 5:
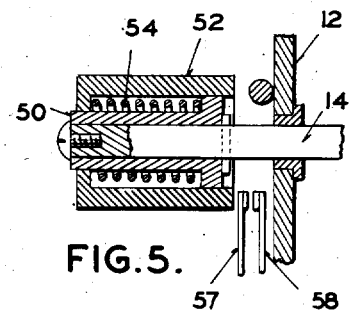
Figure 3:
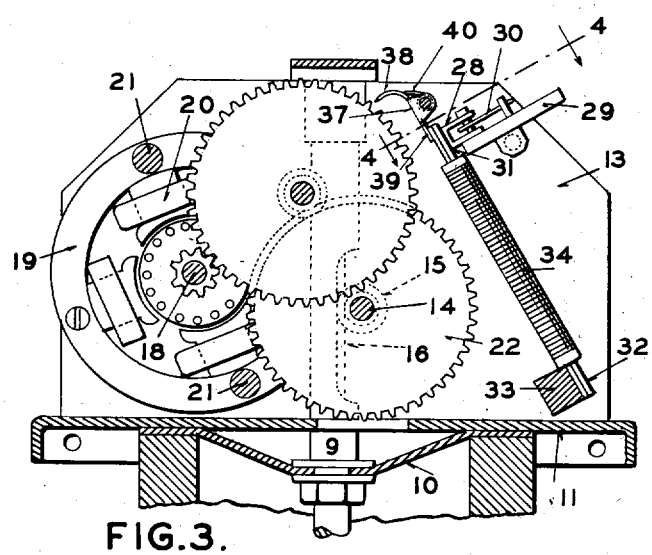
Figure 6:
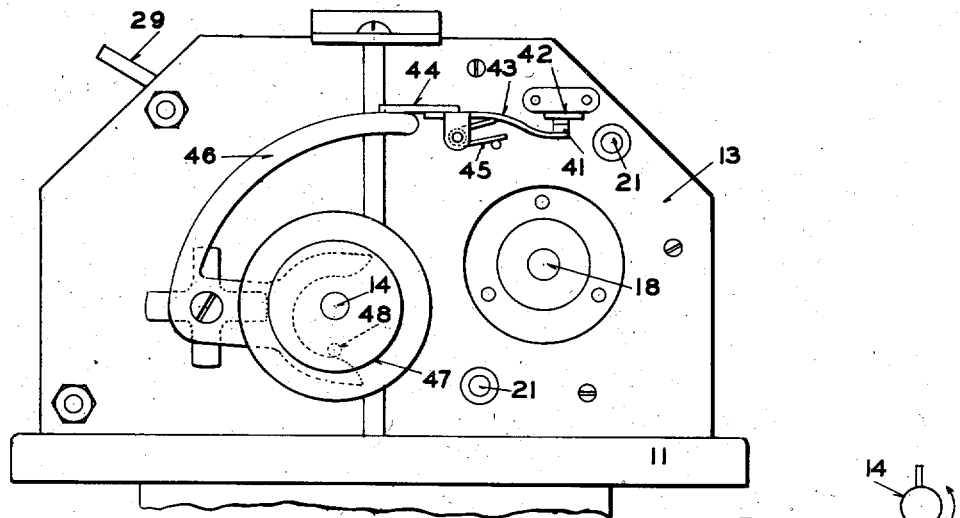
Figure 7:
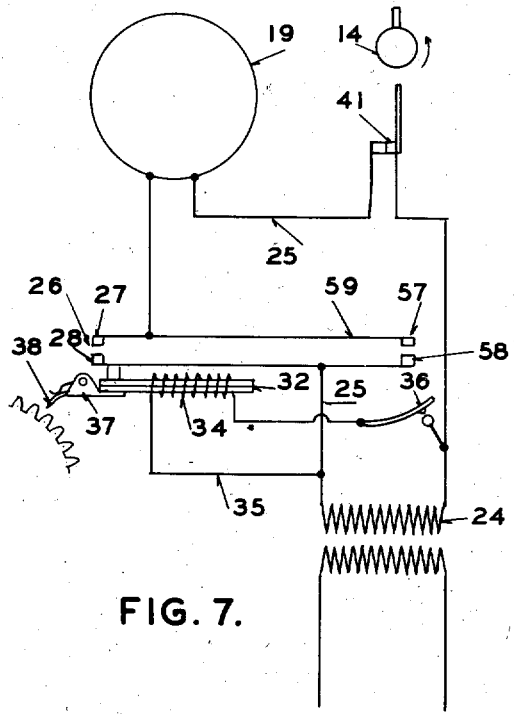
Figure 8:
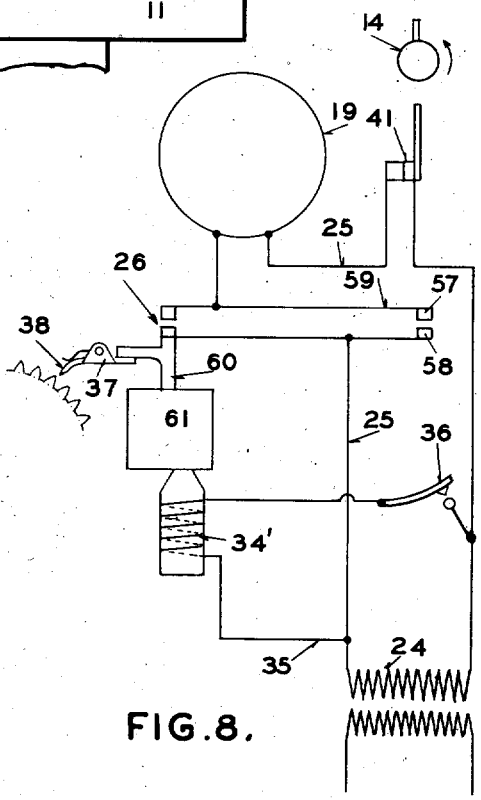

Other objects of my invention will become apparent from the following specification taken in connection with the accompanying drawings in which Figure 1 is a front side view of the control means for the valve, the housing being removed and the valve casing being shown in section; Figure 2 is a top plan view; Figure 3 is a cross sectional view on the line 3—3 of Figure 2; Figure 4 is a cross sectional view on the line 4—4 of Figure 3; Figure 5 is a cross sectional view of the manual control mechanism; Figure 6 is a rear side view; Figure 7 is a wiring diagram of the mechanism; and Figure 8 is a wiring diagram of a modified mechanism in which a bellows type of heat responsive device is substituted for the bimetallic strip.

Since the valve and motor actuating mechanism disclosed is of known construction, they will be only briefly described.

Referring to Figures 1 to 7 in detail, the numeral 1 indicates a valve casing which is provided with the usual inlet and outlet openings 2 and 3, respectively, which are separated by a partition 4 having an opening 5 surrounded by a valve seat 6. The opening 5 is controlled by a valve 7 normally biased toward the valve seat by a spring 8. The valve stem 9 for actuating the valve extends through the top of the valve casing and is surrounded by a flexible diaphragm 10 to prevent leakage. A table 11 having a pair of side frames 12 and 13 is secured to the top of the valve casing and forms a support for the valve control mechanism.

A cross shaft 14 is journaled in the side frames and is provided with a gear 15 for meshing with teeth 16 on the upper portion of the valve stem 9. The cross shaft 14 has a coiled spring 17 which assists the spring 8 in biasing the valve toward closed position. The side frames 12 and 13 also have pivoted thereon, a second cross shaft 18 to which is secured the rotor of an electric motor 19 for opening the valve. The stator 20 of the electric motor is supported between the side frames by suitable rods 21. Reduction gearing, indicated by the numeral 22, provides a connection between the motor shaft 18 and the valve stem actuating cross shaft 14. In order to retard the movement of the valve when it is permitted to close by the motor and to decrease the shock resulting from the accumulated momentum of the gearing, motor, etc., as the valve approaches closed position, the motor shaft 18 is provided with a friction brake 23, the form shown being of the centrifugal type, although other types may be used.

In accordance with my invention, I have provided novel means for energizing the motor to open the valve and for holding the valve open after the motor has become deenergized. In prior motor-controlled valves of the type above described, the thermostat for controlling the motor is subject to the same current as the motor, thus necessitating the use of a permanent magnet for the thermostatically-controlled contacts to cause a quick make and break thereof, and prevent "fluttering" of the contacts. Also, in prior types of valve control means the detent for holding the valve in open position has been controlled by an electromagnet subject to the same current as the motor. This electromagnet is expensive to manufacture, occupies a large amount of space, and is generally subject to "humming." By the use of my novel control means I am able to eliminate the necessity of a permanent magnet for the thermostat and also the electromagnet and its objectionable features.

The motor 19 is connected across the secondary terminals of the transformer 24 by means of circuit 25 in which is a control switch 26 comprising contacts 27 and 28. The contact 27 is secured to an insulated support 29 mounted on the side frame 13, and the contact 28 is pivotally mounted on the support 29 and biased toward disengagement with contact 27 by a suitable spring 30. The contact 28 is also provided with an extension 31 formed of suitable insulating material whereby the switch 26 may be actuated and the motor controlled.

One end of a bi-metallic strip 32 is secured to a cross bar 33, the ends of the bar being rigidly secured to the side frames 12 and 13. The free end of the bi-metallic strip extends beneath the extension 31 of the movable contact 28 and is so positioned normally to the extension that the movable contact is held out of engagement with the contact 27 by means of the spring 30. The central portion of the bi-metallic strip is provided with a thin layer of mica around which is wound a heating coil 34. The heating coil is connected across the terminals of the secondary element of the transformer 24 by means of a circuit 35, thus placing it in parallel with the circuit 25 of the motor. Also connected in the circuit 35 is the thermostatically-controlled switch 36 which, as usual, is situated in the room in which the temperature is to be controlled.

The means for holding the valve in an open position is also controlled by the bi-metallic strip 32 and comprises a latch member 37 pivoted to the side frame 12 adjacent the end of the strip. One end of the latch member is provided with a detent 38 and the other end 39 extends beneath the free end of the bi-metallic strip. A suitable spring 40 biases the detent toward engagement with one of the gears of the reduction gearing 22. The detent is normally held out of engagement with the gear by the bi-metallic strip when it is in its normal position, as shown.

In order to deenergize the motor and thus reduce the current consumption when the valve is open, the circuit 25 is provided with a switch 41 (Figure 6) which is adapted to be opened as the valve approaches open position. The stationary contact 42 of this switch is mounted on suitable insulation on the rear side frame 13. The movable contact 43 is pivoted to the side frame and provided with an insulated extension 44. The contacts are normally biased to engaged position by a suitable spring 45. The means shown to open the switch comprises a lever 46 pivoted to the side frame 13, one end of which engages the extension 44 and the other end of which is forked and adapted to be actuated by the cross shaft 14. The rear end of the cross shaft is provided with a disc 47 upon which is mounted an eccentric pin 48 cooperating with the forked end of the lever.

The manual means for partially opening the valve and holding it open in the event of complete failure of electrical power, is of known construction and will, therefore, be only briefly described.

The external end of shaft 14, which extends beyond the side frame 12, has secured thereto a sleeve 50 provided with a pin 51. A loosely mounted collar 52 surrounds the sleeve 50 and has an inclined slot 53 through which pin 51 extends. A compression spring 54 normally holds the collar in its outer position, as shown in Figure 5. The inner edge of the collar has a notch 55 which engages a stationary pin 56 mounted on the side frame 12 and thus holds the valve open when the collar has been rotated to open the valve. When the collar 52 is in a holding position it is adapted to close a pair of normally disengaged spring contacts 57 and 58 mounted on suitable insulation on the side frame 12. These contacts control a circuit 59 shunting the switch 26 in the motor circuit 25.

In describing the operation of my improved valve control mechanism, it may first be assumed that the valve is in closed position and the thermostatically-controlled switch is in open position. Under these conditions the bi-metallic strip is in its normal position, holding the detent 38 disengaged and permitting the switch 26 to be biased to open position. The switch 41 is closed. If the temperature of the room in which the thermostat is situated should drop, the thermostat will close the switch 36, thus permitting current to flow through circuit 35 and causing the coil 34 to be heated. As the coil 34 is heated, the bi-metallic strip also becomes heated and is warped to a position where it closes switch 26 and permits the detent 38 to be biased toward the adjacent gear. When switch 26 is closed, the motor is then energized and by means of the gearing 22, the gear 15, and valve stem 9, the valve is opened. As the valve approaches open position, the pin 48 on the disc 47 operates the lever 46 and opens the switch 41, deenergizing the motor. The detent 38, during the opening of the valve, permits the cooperating gear to over-run but as soon as the gear stops, it engages a tooth and prevents reverse rotation, thus holding the valve open.

When the room in which the thermostat is situated has become heated to the desired temperature, the thermostat opens switch 36, thus preventing heat from being applied to the bi-metallic strip. This strip will now assume its normal unwarped position, permitting switch 26 to open and disengage the detent from the gear. The valve spring 8 and the shaft spring 17 then return the valve to closed position, the return movement being retarded by the brake 23. The switch 41 also returns to its closed position.

In the event of failure of electrical power, the valve may be partially opened and held in open position by manually rotating collar 52 and engaging pin 56 in the notch 55. This operation automatically closes contacts 57 and 58 and places the motor in circuit with the transformer. When power is resumed, the motor is immediately energized and opens the valve farther, permitting the spring 54 to unlatch the collar 52 from the pin. When the collar becomes unlatched, the contacts 57 and 58 will be broken and the motor deenergized, and the valve will be returned to closed position. The control of the valve will then be restored to the thermostatically-controlled switch, its position determining whether the valve remains closed or is reopened.

From the above described apparatus and its operation, the many advantages it possesses are readily apparent. Since the thermostatically-controlled switch is not in series circuit with the motor, the current in its circuit can be much smaller than the motor current, thus permitting the usual permanent magnet for the thermostatic switch to be eliminated. Also, by having the means (bi-metallic element and heating coil) for controlling the detent which holds the valve open, operated by a circuit other than the motor circuit, the current during the open position of the valve is considerably reduced. The rapidity of action of the bi-metallic strip may be varied as desired, since such depends upon the flow of current through the heating coil. The heating coil and bi-metallic strip are considerably more economical to manufacture than the large electromagnet used in the past to hold the valve in an open position. Proper adjustment of the bimetallic strip is also very easily accomplished.

Other forms of heat responsive devices besides the bi-metallic strip and heating coil may be used if found desirable. In Figure 8 I have shown diagrammatically how a vapor motor may be substituted for the strip of heating coil. This motor comprises a stem 60 actuated by a gas containing bellows 61, the gas being heated by a coil 34' which is in the thermostatically-controlled circuit 35. When the switch 36 is closed, the gas will be heated, causing the bellows to expand and operate the stem 60, which will close the motor switch 26 and permit the detent to assume an engaging position. The remainder of the structure is identical with that previously described.

Having fully described my invention, what I claim as new and desire to secure by Letters Patent of the United States is:

1. In apparatus of the class described, the combination of a regulating device which is biased to a selected position, electro-responsive means for moving the regulating device to another position, an electrical circuit for said means, means for holding the regulating device in said last named position, and an auxiliary circuit comprising a thermostatically-controlled heat-responsive device for controlling said holding means.

2. In apparatus of the class described, the combination of a regulating device which is biased to a selected position, electro-responsive means for moving the regulating device to another position, an electrical circuit for said means, means for holding the regulating device in said last named position, an electrical circuit including a thermostatically-controlled switch and a heat-responsive device, said circuit being in parallel with said first named circuit, and means for controlling said holding means by said heat-responsive device.

3. In apparatus of the class described, the combination of a regulating device, electro-responsive means for moving said device from one position to another, means for holding said regulating device in said last named position, and means comprising a thermostatically-controlled heat-responsive device for controlling the electro-responsive means and the holding means.

4. In apparatus of the class described, the combination of a regulating device which is biased toward a selected position, electro-responsive means for moving the regulating device to another position, an electrical circuit including a switch for controlling the electro-responsive means, means for holding the regulating device in said last named position against the biasing means, and means comprising a thermostatically-controlled heat-responsive device for controlling the switch and the holding means.

5. In apparatus of the class described, the combination of a regulating device which is biased toward a selected position, electro-responsive means for moving the regulating device to another position, an electrical circuit including a switch for controlling the electro-responsive means, means for holding the regulating device in said last named position against the biasing means, an auxiliary circuit comprising a thermostatically-controlled switch and a heat-responsive device, and means for controlling the first named switch and the holding means by the heat-responsive device.

6. In apparatus of the class described, the combination of a regulating device, electro-responsive means for moving said device from one position to another, means for deenergizing the electro-responsive means when the regulating device is in said last named position, means for holding the regulating device in the last named position, and thermostatically-controlled heat-responsive means for controlling the holding means and the energization of the electro-responsive means.

7. In apparatus of the class described, the combination of a regulating valve which is biased to a closed position, an electric motor for moving the valve to open position, an electrical circuit for said motor including a switch, means for holding the valve in open position against the biasing means, a thermostatically-controlled heat-responsive device for closing the switch and for permitting the holding means to assume an operative position, and means for deenergizing the motor when the valve approaches open position.

8. In apparatus of the class described, the combination of a valve biased to closed position, an electric motor and reduction gearing for opening the valve, an electrical circuit for the motor comprising a switch, a detent for engaging the gearing to hold the valve in open position, a heat-responsive device for simultaneously controlling the switch and the detent, a circuit including a thermostatically-controlled heating coil for the heat-responsive device, said last named circuit being in parallel with the motor circuit, and means independent of the motor circuit switch for breaking the motor circuit when the valve approaches open position.

9. In apparatus of the class described, the combination of a regulating device which is biased to a closed position, actuating means comprising a rotary motor and gear train for moving the regulating device to open position, an electric circuit for said means, means adapted to engage the actuating means for holding the device in an open position, and an auxiliary circuit comprising a thermostatically controlled heat responsive device for controlling said holding means.

ROBERT T. WILLIAMS.